United States Patent
Schaef et al.

(10) Patent No.: US 12,314,712 B1
(45) Date of Patent: May 27, 2025

(54) PARTITIONING CODE BASES FOR PARALLEL EXECUTION OF CODE ANALYSIS

(71) Applicant: Amazon Technologies, Inc., Seattle, WA (US)

(72) Inventors: Martin Schaef, Queens, NY (US); Linghui Luo, Paderborn (DE); Nicolas Leandro Rosner, New York, NY (US); Aritra Sengupta, Mountain View, CA (US); Antonio Filieri, Sunnyvale, CA (US); Thomas L J Cottenier, Sammamish, WA (US); Lee Pike, Portland, OR (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/935,504

(22) Filed: Sep. 26, 2022

(51) Int. Cl.
*G06F 8/75* (2018.01)
*G06F 8/71* (2018.01)

(52) U.S. Cl.
CPC .  *G06F 8/75* (2013.01); *G06F 8/71* (2013.01)

(58) Field of Classification Search
CPC ..................................... G06F 8/75; G06F 8/71
See application file for complete search history.

(56) References Cited

U.S. PATENT DOCUMENTS

| | | | | |
|---|---|---|---|---|
| 6,226,652 | B1 * | 5/2001 | Percival .................... | G06F 8/71 |
| | | | | 707/999.203 |
| 9,519,464 | B2 * | 12/2016 | Dang ....................... | G06F 8/33 |
| 10,901,876 | B2 * | 1/2021 | Herrin .................. | G06F 11/3668 |
| 10,909,028 | B1 * | 2/2021 | Khanduri ............ | G06F 11/3692 |
| 2010/0306754 | A1 * | 12/2010 | Javed ..................... | G06F 8/443 |
| | | | | 717/158 |
| 2012/0291004 | A1 * | 11/2012 | Kumar ..................... | G06F 8/75 |
| | | | | 717/105 |
| 2013/0074036 | A1 * | 3/2013 | Brandt ...................... | G06F 8/33 |
| | | | | 717/113 |
| 2013/0179867 | A1 * | 7/2013 | Fitterer .................... | G06F 8/71 |
| | | | | 717/130 |

(Continued)

FOREIGN PATENT DOCUMENTS

| | | | | |
|---|---|---|---|---|
| AU | 2018203054 | B2 * | 12/2019 | .......... G06F 11/3664 |
| CN | 114443069 | A * | 5/2022 | |

OTHER PUBLICATIONS

Hao Yuan and Patrick Th. Eugster. 2009. "An Efficient Algorithm for Solving the Dyck-CFL Reachability Problem on Trees". In ESOP (LNCS, vol. 5502). Springer, pp. 175-189.

(Continued)

*Primary Examiner* — Daxin Wu
(74) *Attorney, Agent, or Firm* — Scott Foster; Kowert, Hood, Munyon, Rankin & Goetzel, P.C.

(57) ABSTRACT

A partitioning technique is applied to divide input code into different portions. Different partitioning techniques can be applied in order to optimize the portioning of the code to account for various features of the code, such as code dependencies. Once partitioned, the code analysis tasks execute in parallel on the code portions. In this way, improved code analysis performance is obtained. Moreover, the addition of new code analysis tasks may not impact overall analysis performance as the partitioning can help to offset added or unknown analysis latency of new code analysis tasks.

20 Claims, 10 Drawing Sheets

(56) References Cited

U.S. PATENT DOCUMENTS

| | | | |
|---|---|---|---|
| 2016/0117154 A1* | 4/2016 | Przygienda | G06F 8/433 |
| | | | 717/152 |
| 2017/0177324 A1* | 6/2017 | Frank | G06F 16/958 |
| 2018/0373507 A1* | 12/2018 | Mizrahi | G06F 18/24 |
| 2019/0079754 A1* | 3/2019 | Makkar | G06F 8/71 |
| 2020/0225935 A1* | 7/2020 | Avgustinov | G06F 11/3624 |
| 2020/0293617 A1* | 9/2020 | Luo | G06N 3/08 |
| 2020/0401702 A1* | 12/2020 | Karabatis | G06F 8/75 |
| 2021/0132935 A1* | 5/2021 | Dinh | G06F 9/4411 |
| 2021/0208857 A1* | 7/2021 | Mahajan | G06F 8/427 |
| 2021/0406004 A1* | 12/2021 | Ray | G06F 8/77 |
| 2022/0137959 A1* | 5/2022 | Neves | G06F 8/34 |
| | | | 717/132 |
| 2023/0281318 A1* | 9/2023 | Clement | G06F 8/33 |
| | | | 726/25 |

OTHER PUBLICATIONS

Xin Zheng and Radu Rugina. 2008. "Demand-driven alias analysis for C". In POPL. ACM, pp. 197-208.

Zhiqiang Zuo, John Thorpe, Yifei Wang, Qiuhong Pan, Shenming Lu, Kai Wang, Guoqing Harry Xu, Linzhang Wang, and Xuandong Li. 2019. "Grapple: A Graph System for Static Finite-State Property Checking of Large-Scale Systems Code. In EuroSys". ACM, pp. 1-17.

Martin Blais, "Snakefood User Manual," retrieved from https://furius.ca/snakefood/doc/snakefood-doc.html on Oct. 26, 2022.

Aws Albarghouthi, Rahul Kumar, Aditya V. Nori, and Sriram K. Rajamani. "Parallelizing top-down interprocedural analyses". In PLDI. ACM, 2012, pp. 217-228.

Steven Arzt and Eric Bodden. "Reviser: Efficiently Updating IDE-/IFDS-Based Data-Flow Analyses in Response to Incremental Program Changes". In Proceedings of the 36th International Conference on Software Engineering (Hyderabad, India) (ICSE 2014). Association for Computing Machinery, New York, NY, USA, pp. 288-298. https://doi.org/10.1145/2568225.25682432014.

Steven Arzt and Eric Bodden. "StubDroid: Automatic Inference of Precise Data-Flow Summaries for the Android Framework". In 2016 IEEE/ACM 38th International Conference on Software Engineering (ICSE). 2016. pap. 725-735. https://doi.org/10.1145/2884781.2884816.

Vipin Balachandran. 2013. "Reducing Human Effort and Improving Quality in Peer Code Reviews Using Automatic Static Analysis and Reviewer Recommendation". In Proceedings of the 2013 International Conference on Software Engineering (San Francisco, CA, USA) (ICSE '13). IEEE Press, pp. 931-940.

Jiri Barnat, Lubos Brim, and Jitka Stribrná. 2000. "Distributed LTL Model-Checking in SPIN". In SPIN (LNCS, vol. 2057). Springer, pp. 209-216.

Osbert Bastani, Saswat Anand, and Alex Aiken. 2015. "Specification Inference Using Context-Free Language Reachability". In POPL. ACM, pp. 553-566.

Cristiano Calcagno, Dino Distefano, Jérémy Dubreil, Dominik Gabi, Pieter Hooimeijer, Martino Luca, Peter W. O'Hearn, Irene Papakonstantinou, Jim Purbrick, and Dulma Rodriguez. 2015. "Moving Fast with Software Verification". In NFM (LNCS, vol. 9058). Springer, pp. 3-11.

Justin Collins. [n.d.]. "Brakeman: Ruby on Rails Static Analysis Security Tool", from https://brakemanscanner.org/, Aug. 9, 2022, pp. 1-5.

Christopher L. Conway, Kedar S. Namjoshi, Dennis Dams, and Stephen A. Edwards. 2005. "Incremental Algorithms for Interprocedural Analysis of Safety Properties". In Computer Aided Verification, Kousha Etessami and Sriram K. Rajamani (Eds.). Springer, pp. 449-461.

Utkarsh Desai, Sambaran Bandyopadhyay, and Srikanth Tamilselvam. 2021. "Graph Neural Network to Dilute Outliers for Refactoring Monolith Application". In Thirty-Fifth AAAI Conference on Artificial Intelligence, AAAI 2021, Thirty-Third Conference on Innovative Applications of Artificial Intelligence, IAAI 2021, The Eleventh Symposium on Educational Advances in Artificial Intelligence, EAAI 2021, Virtual Event, Feb. 2-9, 2021. AAAI Press, pp. 72-80. https://ojs.aaai.org/index.php/AAAI/article/view/16079.

Lisa Nguyen Quang Do, Karim Ali, Benjamin Livshits, Eric Bodden, Justin Smith, and Emerson Murphy-Hill. 2017. "Just-in-Time Static Analysis". In Proceedings of the 26th ACM SIGSOFT International Symposium on Software Testing and Analysis (Santa Barbara, CA, USA) (ISSTA 2017). Association for Computing Machinery, New York, NY, USA, pp. 307-317. https://doi.org/10.1145/3092703.3092705.

J Michael Emmi, Liana Hadarean, Ranjit Jhala, Lee Pike, Nicolás Rosner, Martin Schäf, Aritra Sengupta, and Willem Visser. 2021. "RAPID: Checking API Usage for the Cloud in the Cloud". ACM, New York, NY, USA, pp. 1416-1426. https://doi.org/10.1145/3468264.3473934.

Cormac Flanagan, K Rustan M Leino, Mark Lillibridge, Greg Nelson, James B Saxe, and Raymie Stata. 2002. "Extended static checking for Java". In Proceedings of the ACM SIGPLAN 2002 Conference on Programming language design and implementation. pp. 234-245.

Jonas Fritzsch, et al. 2018. "From Monolith to Microservices: A Classification of Refactoring Approaches". In Software Engineering Aspects of Continuous Development and New Paradigms of Software Production and Deployment—First International Workshop, DEVOPS 2018, Chateau de Villebrumier, France, Mar. 5-6, 2018, Revised Selected Papers (Lecture Notes in Computer Science, vol. 11350), Jean-Michel Bruel, Manuel Mazzara, and Bertrand Meyer (Eds.). Springer, pp. 128-141. https://doi.org/10.1007/978-3-030-06019-0_10.

Diego Garbervetsky, Edgardo Zoppi, and Benjamin Livshits. 2017. "Toward Full Elasticity in Distributed Static Analysis! The Case of Callgraph Analysis" (ESEC/FSE 2017). Association for Computing Machinery, New York, NY, USA, pp. 442-453. https://doi.org/10.1145/3106237.3106261.

Emmanuel Geay, Eran Yahav, and Stephen Fink. 2006. "Continuous code-quality assurance with SAFE". In Proceedings of the 2006 ACM SIGPLAN symposium on Partial evaluation and semantics-based program manipulation. pp. 145-149.

Orna Grumberg, Tamir Heyman, Nili Ifergan, and Assaf Schuster. 2005. "Achieving Speedups in Distributed Symbolic Reachability Analysis Through Asynchronous Computation". In IFIP (LNCS, vol. 3725). Springer, pp. 129-145.

Nevin Heintze and David A. McAllester. "On the Cubic Bottleneck in Subtyping and Flow Analysis". LICS '97: Proceedings of the 12th Annual IEEE Symposium on Logic in Computer ScienceJune 1997, pp. 342-351.

Susan Horwitz, Thomas W. Reps, and David W. Binkley. 1988. "Interprocedural Slicing Using Dependence Graphs". In PLDI. ACM, pp. 35-46.

Di Jin, Zhizhi Yu, Pengfei Jiao, Shirui Pan, Dongxiao He, Jia Wu, Philip Yu, and Weixiong Zhang. 2021. "A Survey of Community Detection Approaches: From Statistical Modeling to Deep Learning". IEEE Transactions on Knowledge and Data Engineering (2021). https://doi.org/10.1109/TKDE.2021.3104155, pp. 1-22.

David S Johnson. 1973. "Near-optimal bin packing algorithms". Ph.D. Dissertation. Massachusetts Institute of Technology, pp. 1-401.

Anup K. Kalia, Jin Xiao, Rahul Krishna, Saurabh Sinha, Maja Vukovic, and Debasish Banerjee. 2021. "Mono2Micro: A Practical and Effective Tool for Decomposing Monolithic Java Applications to Microservices". Association for Computing Machinery, New York, NY, USA, pp. 1214-1224. https://doi.org/10.1145/3468264.3473915.

John Kodumal and Alexander Aiken. 2004. "The set constraint/CFL reachability connection in practice". In PLDI. ACM, pp. 207-218.

Rahul Kumar and Eric G. Mercer. 2005. "Load Balancing Parallel Explicit State Model Checking". Elsevier, ENTCS 128 (2005), pp. 19-34.

James A. Kupsch, Barton P. Miller, Vamshi Basupalli, and Josef Burger. 2017. "From continuous integration to continuous assurance". In 2017 IEEE 28th Annual Software Technology Conference (STC). pp. 1-9. https://doi.org/10.1109/STC.2017.8234450.

(56) References Cited

OTHER PUBLICATIONS

Yi Lu, Lei Shang, Xinwei Xie, and Jingling Xue. 2013. "An Incremental Points-to Analysis with CFL-Reachability". In CC (LNCS, vol. 7791). Springer, pp. 61-81.

Mario Méndez-Lojo, Augustine Mathew, and Keshav Pingali. 2010. "Parallel inclusion-based points-to analysis". In OOPSLA. ACM, pp. 428-443.

Meta. [n.d.]. "Infer: a static analysis platform for Java, C, and Objective-C". retrieved from https: //fbinfer.com/docs/about-Infer on Oct. 26, 2022, p. 1.

Mangala Gowri Nanda, Monika Gupta, Saurabh Sinha, Satish Chandra, David Schmidt, and Pradeep Balachandran. 2010. "Making Defect-Finding Tools Work for You". In Proceedings of the 32nd ACM/IEEE International Conference on Software Engineering—vol. 2 (Cape Town, South Africa) (ICSE '10). Association for Computing Machinery, New York, NY, USA, pp. 99-108. https://doi.org/10.1145/1810295.1810310.

Mangala Gowri Nanda and Saurabh Sinha. 2009. "Accurate interprocedural null-dereference analysis for Java". In 2009 IEEE 31st International Conference on Software Engineering. IEEE, pp. 133-143.

NIST. [n.d.]. "Juliet Test Suite for Java". retrieved from https://samate.nist.gov/SRD/testsuite.php on Oct. 26, 2022, pp. 1-10.

OWASP. [n.d.]. "FindSecBugs: the SpotBugs plugin for security audits of Java web applications". retrieved from https://find-sec-bugs.github.io/ on Oct. 26, 2022, pp. 1-7.

OWASP. [n.d.]. "OWASP". retrieved from https://owasp.org/www-project-benchmark/ on Oct. 26, 2022, pp. 1-4.

Praetorian, Inc. [n.d.]. "Gokart: a security-oriented static analysis for Golang with a focus on minimizing false positives". retrieved from https://github.com/praetorian-inc/gokart/ on Oct. 26, 2022, pp. 1-6.

Thomas Reps, Susan Horwitz, and Mooly Sagiv. 1995. "Precise Interprocedural Dataflow Analysis via Graph Reachability". In Proceedings of the 22nd ACM SIGPLAN-SIGACT Symposium on Principles of Programming Languages (San Francisco, California, USA) (POPL '95). Association for Computing Machinery, New York, NY, USA, pp. 49-61. https://doi.org/10.1145/199448.199462.

Thomas W. Reps. 1997. "Program Analysis via Graph Reachability". In ISLP. MIT, pp. 5-19.

ThomasW. Reps, Susan Horwitz, and Shmuel Sagiv. 1995. "Precise Interprocedural Dataflow Analysis via Graph Reachability". In POPL. ACM, pp. 49-61.

Zachary Rice. [n.d.]. "Gitleaks: a SAST tool for detecting and preventing hardcoded secrets like passwords, api keys, and tokens in git repositories", retrieved from https://github.com/zricethezav/gitleaks/ on Oct. 26, 2022, pp. 1-11.

Jonathan Rodriguez and Ondrej Lhoták. [n.d.]. "Actor-Based Parallel Dataflow Analysis". In CC (LNCS, vol. 6601). Springer, 2011, pp. 179-197.

Atanas Rountev, Mariana Sharp, and Guoqing Xu. 2008. "IDE Dataflow Analysis in the Presence of Large Object-Oriented Libraries". In Compiler Construction, Laurie Hendren (Ed.). Springer, pp. 53-68.

Caitlin Sadowski, Jeffrey van Gogh, Ciera Jaspan, Emma Söderberg, and Collin Winter. 2015. "Tricorder: Building a Program Analysis Ecosystem". In Proceedings of the 37th International Conference on Software Engineering—vol. 1 (Florence, Italy) (ICSE '15). IEEE Press, pp. 598-608.

Amazon Web Services. [n.d.]. "Elastic Compute Cloud (EC2) Pricing". retrieved from https://aws.amazon.com/ec2/pricing/ on Oct. 26, 2022, pp. 1-7.

Gagandeep Singh, Markus Püschel, and Martin T. Vechev. 2017. "Fast polyhedral abstract domain". In POPL. ACM, pp. 46-59.

SonarSource, S.A. [n.d.]. "Sonarqube: a Static Application Security Testing (SAST) solution to detect security issues in code review". retrieved from https://www.sonarqube.org/features/security/ on Oct. 26, 2022, p. 1-.

Yu Su, Ding Ye, and Jingling Xue. 2014. "Parallel Pointer Analysis with CFLReachability". In ICPP. IEEE Computer Society, pp. 451-460.

David Trabish, Andrea Mattavelli, Noam Rinetzky, and Cristian Cadar. 2018. "Chopped symbolic execution". In ICSE. ACM, pp. 350-360.

Jens Van der Plas, Quentin Stiévenart, Noah Van Es, and Coen De Roover. 2020. "Incremental Flow Analysis through Computational Dependency Reification". In 2020 IEEE 20th International Working Conference on Source Code Analysis and Manipulation (SCAM). pp. 25-36. https://doi.org/10.1109/SCAM51674.2020.00008.

Dimitrios Vardoulakis and Olin Shivers. 2010. "CFA2: A Context-Free Approach to Control-Flow Analysis". In ESOP (LNCS, vol. 6012). Springer, pp. 570-589.

Kai Wang, Aftab Hussain, Zhiqiang Zuo, Guoqing Xu, and Ardalan Amiri Sani. 2017. "Graspan: A Single-Machine Disk-Based Graph System for Interprocedural Static Analyses of Large-Scale Systems Code". In ASPLOS. ACM, pp. 389-404.

\* cited by examiner (a) Initial dependency graph of program P.

(b) Dependency graph of P augmented with transitive relations up to radius $k = 2$ (red dashed edges).

```
Algorithm 1: Initial portions.
   Input  : files F = {f₀, f₁, ...}, neighborhood radius k
   Output: initial portions R = {r₀, r₁, ...}
 1 (V, E) ← computeDependencyGraph(F)
 2 // augment dependency relation
 3 for v ∈ V do
 4 │   neighbors ← verticesWithinDistance(v, k)
 5 │   for n ∈ neighbors do
 6 │   │   E ← E ∪ (v,n)
 7 │   end for
 8 end for
 9 // build initial portion
10 R ← ∅
11 for v ∈ V do
12 │   r ← {v}
13 │   for (v,u) ∈ E do
14 │   │   r ← r ∪ {u}
15 │   end for
16 │   R ← R ∪ r
17 end for
18 return R
```

FIG. 5A

```
Algorithm 2: Split.
  Input  : Augmented dependency graph G = (GT, ET),
           Portions R = {r₀, r₁, ..., rₘ},
           Fraction of high-degree nodes 0 ≤ p < 1,
           Maximum size S
  Output : Split portions R' = {r'₀, r'₁, ..., r'ₘ},
           m ≥ n, ∀r' ∈ R' : |r'| ≤ S 1 for r ∈ R do
2 |   if |r| > S then
3 |   |   R ← (R \ {r}) ∪ split(r, p, G, S)
4 |   end if
5 end for
6 return R 7 Function split(r, p, G, S):
8 |   (Vᴛ, Eᴛ) ← extractSubgraph(G, r)
9 |   Vᴛₛ ← sortByDegreeDesc(Vᴛ)
10|   /* the p % highest degree nodes are
          replicated in each subset              */
11|   pᵣ ← ⌊p · |r|⌋
12|   hdn ← [vᴛₛ₍₀₎, ..., vᴛₛ₍ₚᵣ₎]        // high-connectivity
13|   ldn ← [vᴛₛ₍ₚᵣ₊₁₎, ...]             // low-connectivity
14|   nSubsets ← ⌊(|r| - pᵣ)/(S - pᵣ)⌋ + 1
15|   divide ldn uniformly into nSubsets parts
          {ldn₀, ldn₁, ..., ldn_{nSubsets-1}}
16|   return
          {hdn ∪ ldn₀, hdn ∪ ldn₁, ..., hdn ∪ ldn_{nSubsets-1}}
```

FIG. 5B

Algorithm 3: Merge.

Input : portions $R = \{r_0, r_1, ..., r_n\}$,
 maximum size $S$
Output: merged portions $R' = \{r'_0, r'_1, ..., r'_m\}$, $m \leq n$ 1 for $r_i \in R$ do
2     if $\exists r_j \in R$ s.t. $r_i \subseteq r_j$ and $i \neq j$ then
3        $R \leftarrow R \setminus \{r_i\}$
4     end if
5 end for
6 return nextFit(R, S)
7
8 Function nextFit(R, S):
9     $T_s \leftarrow$ sortBySizeAsc(R)
10    $R' \leftarrow \emptyset$
11    $r \leftarrow \emptyset$
12    for $t \in T_s$ do
13       if $|r| + |t| \leq S$ then
14          $r \leftarrow r \cup t$
15       else
16          $R' \leftarrow R' \cup r$
17          $r \leftarrow \{t\}$
18    end for
19    $R' \leftarrow R' \cup r$
20    return $R'$

FIG. 5C

PARTITIONING CODE BASES FOR PARALLEL EXECUTION OF CODE ANALYSIS

BACKGROUND

Programming languages offer developers, designers, and other users with the ability to precisely specify the operation of various hardware or software designs for many different applications. Given the wide variety of programming languages, these developers, designers, and other users may encounter or otherwise use code written in a programming language which may be less familiar to the developer. Code development tools offer developers, designers, and other users with different capabilities to improve code performance and identify errors, which may in the exemplary scenario described above, help to overcome a developer's lack of familiarity with a programming language (or an environment in which the programming language is deployed) so that high performing code may still be written.

BRIEF DESCRIPTION OF THE DRAWINGS

FIGS. 5A-5C illustrate example algorithms for applying a partitioning technique to a code base, according to some embodiments.

Figure 1:
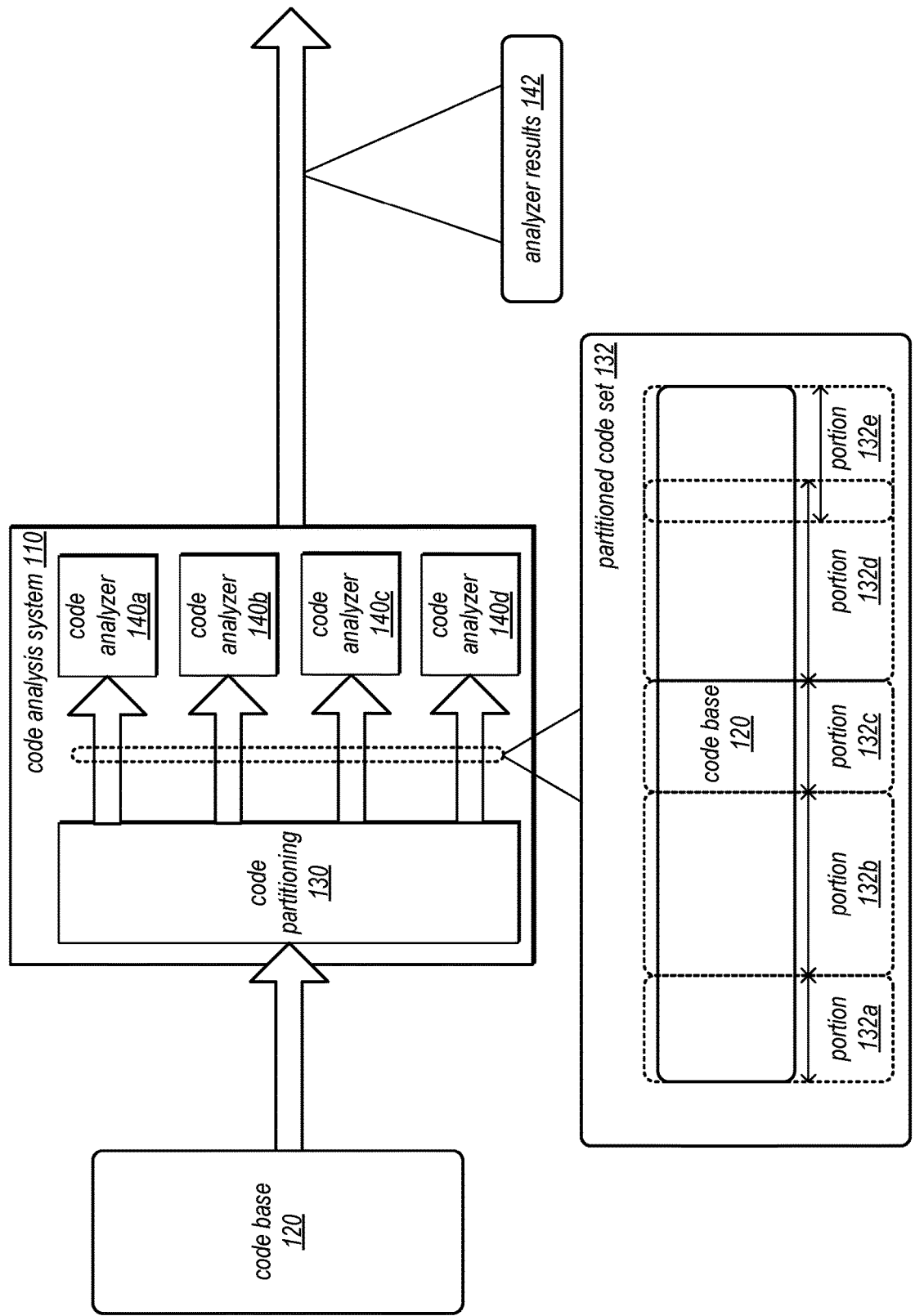
FIG. 1 is a logical block diagram illustrating partitioning code bases for parallel execution of code analysis, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various techniques for partitioning code bases for parallel execution of code analysis are described herein. Code development incurs multiple responsibilities when writing, editing, and updating code. Not only does the code have to perform correctly to ensure proper application functioning, the code may also have to be safe, secure, and/or otherwise conform to other performance goals that may be beyond proper functioning. Application security is, for example, an area where developers may have to consider how code creates or exposes security flaws in an application.

While one approach to ensuring that these responsibilities are met may be to utilize individuals with subject matter expertise (e.g., individuals for application development and different individuals for security review), techniques have been developed to utilize code analysis tasks (e.g., tests or other operations to analyze code) for the various performance goals (e.g., security, efficiency, latency, etc.) of an application. For example, Static Application Security Testing (SAST) shifts further to the left in the software development life-cycle (e.g., performing security testing when code is being developed) and becomes the responsibility of application developers rather than security experts. This creates a growing demand for easy-to-use solutions by developers that may not be experts in the other subject matter areas that may be analyzed, such as security.

In some instances, development teams do not have the capacity or expertise to configure and maintain their own static analysis infrastructure and prefer SAST tools, systems, or services that offer a variety of static analyses on demand. These SAST tools may provide a simple interface through which developers submit code and build artifacts (in their languages of choice) and receive recommendations on how to improve the code. Internally, such SAST tools, systems, or services may perform analysis tasks by employing a variety of static analysis tests. For example, SAST services may be implemented as a cloud-based service (e.g., as part of a provider network like code development service 210 discussed below with regard to FIG. 2), and the individual analysis tasks are containerized and instantiated on-demand on cloud-based machines. Developers may expect SAST tools, systems, or services to handle inputs (e.g., code bases) of arbitrary complexity, and still deliver results within a certain time window. This is may be especially true for developers that integrate SAST tools, systems, or services in their continuous integration and deployment (CI/CD) pipelines.

To maintain a predictable response time, SAST tools, systems, or services face the challenge that they need to be able to scale to different sizes of inputs, and that, every time that a new analysis task is added, the new tool may have to be implemented so that it does not slow down the response time for developers to receive SAST results. Thus the techniques of partitioning code bases for parallel execution of code analysis as discussed below may provide for SAST tools, systems, or services, as well as other code analysis systems, an optimal way to parallelize the performance of different code analysis tasks, including a new code analysis task, while meeting performance goals for, or minimizing impact on, performing code analysis.

While some approaches have attempted vertical scaling to address scenarios of improving performance of different code analysis tasks by adding more memory or faster machines, such approaches may not be a cost-effective solution to the risk of running out of time or space when analyzing complex inputs. Provisioning machines large enough to handle the most complex analysis inputs, for instance, would make the tool, system, or service unnecessarily expensive for developers that analyze smaller and simpler code bases. In cloud-service implementations, a large number of small machines is typically significantly less expensive than a small number of high-performance machines. Moreover, since many code analysis tasks, such as SAST tools, have superlinear time complexity, even the most powerful machine will eventually not suffice.

Thus, a horizontal scaling strategy to distribute and balance the analysis load may provide improved performance of code analysis. Horizontal scaling may split up code base inputs into different portions such that each analysis tool employed by the tool, system, or service can handle its input within the expected response time. The different pieces can then be analyzed on parallel instances of a given analysis task. In some embodiments, such a horizontal scaling can be configured per analysis task, but without modifying the analysis task. More complex tasks can be configured to handle smaller pieces of code than lightweight tools to ensure that the overall latency of the tool, system, or service does not change when a new complex task gets added.

Various techniques for code partitioning may be implemented, as discussed in detail below. For example, one approach may take as input a code base (e.g., a program) and a bound for the size of code that should be analyzed by each single task. Then, the technique may utilize a configurable partitioning strategy to split the input code base into portions such that the amount of code in each portion is below the provided bound.

Different partitioning techniques for splitting code into portions may handle different considerations in different ways. One consideration is that information may be lost because dependent code fragments are grouped into separate portions. This may impact the precision and recall of code analysis tasks. For example, a real defect arising from the interaction between two classes in a code base may become a false negative if those classes end up in different portions. Similarly, the evidence that a vulnerability has been correctly mitigated may become invisible when defect and mitigation split across portions, yielding a false positive.

Another consideration of partitioning techniques is that when splitting code into partitions, the complexity of code analysis tasks may not be tied just to the size of the code. For example, data-flow analysis may be cubic in the size of data-flow facts that are tracked. That is, if data-flow facts are not evenly distributed across the program, partitioning may not reduce the overall time or memory consumption of data-flow analysis if all facts end up in the same portion. Other analysis techniques, such as the bi-abduction, may need to have a different type of partitioning since their complexity is not tied to data-flow facts.

Another consideration of partitioning techniques is to find a partitioning technique that works for different programming languages and code analysis tasks. Partitioning techniques may have different complexities for different languages. For example, identifying the direct dependencies of a Java class file may be roughly constant since it is sufficient to look at the constant pool. In Python, however, one has to iterate over the entire syntax tree of a file to determine its dependencies. A partitioning technique that takes dependencies into consideration may be computationally more expensive for Python than for Java. So the cost-benefit of partitioning may depend on the analyzed language and the complexity of the code analysis tasks to be applied.

Figure 8:
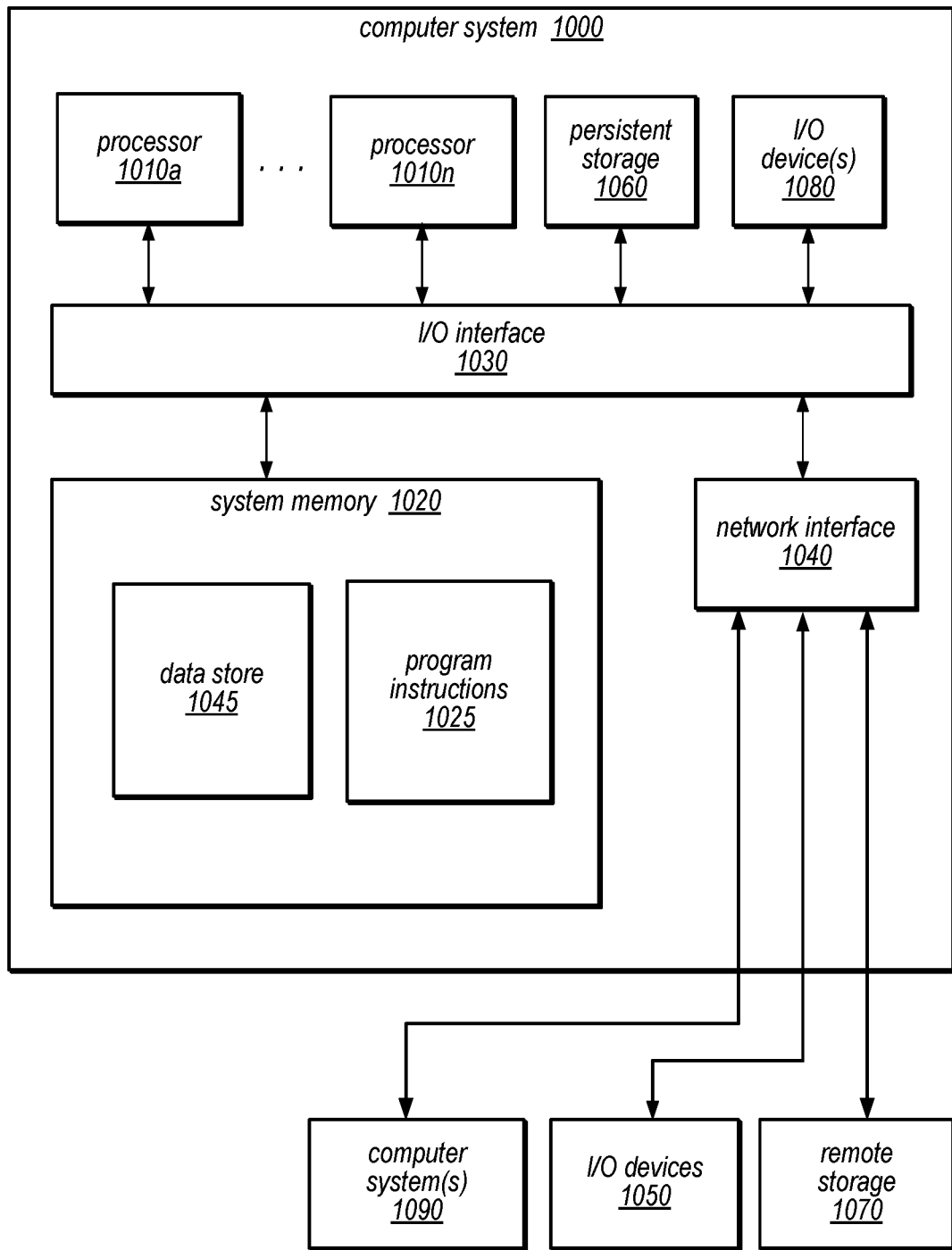
FIG. 8 is a block diagram illustrating an example computing system, according to some embodiments.

In view of these considerations, in some embodiments, techniques for selecting and/or configuring a partitioning technique to apply (out of multiple partitioning techniques) may be performed, as discussed below with regard to FIGS. 3 and 8. Moreover, machine learning techniques may be applied to adapt the selection and/or configuration over time.

In various embodiments, partitioning code bases for parallel execution of code analysis may improve the performance of code analysis systems, which may also lead to improved application performance in view of the results provided by code analysis systems. For example, partitioning code bases can significantly improve latency, scalability, and cost-effectiveness of providing cloud-based SAST tools, systems or services. Partitioning code base techniques can be used to reduce the cost of integrating new code analysis tasks into a code analysis system. Instead of developing and benchmarking explicit splitting strategies for every new task, adaptive selection and configuration of partitioning techniques could be performed, allowing partitioning techniques to be adjusted (e.g., based on the number of observed timeouts of an analysis task that fails to complete within a time limit).

FIG. 1 is a logical block diagram illustrating partitioning code bases for parallel execution of code analysis, according to some embodiments. Code analysis system 110 may be a stand-alone application or tool, in some embodiments. Code analysis system 110 may be a service, offered by a provider network, like provider network 200 discussed below with regard to FIG. 2. In some embodiments, code analysis system 110 may be feature or component that is integrated as part of (or utilized by) a larger code service, such as code development service 210 as discussed below with regard to FIG. 2.

Code analysis system 110 may implement various code analysis tasks as different code analyzers, such as code analyzer 140*a*, 140*b*, 140*c*, and 140*d*. Code analysis tasks, like the SAST tests discussed above, may apply various operations to detect different errors, conditions, concerns, violations, effects, or other features of an input code in order to provide an indication of these different errors, conditions, concerns, violations, effects, or other features of the input code to allow a developer to decide whether changes to the input code should be made in furtherance of one or more performance goals. Because these code analyzers 140*a-d* detect different errors, conditions, concerns, violations, effects, or other features, code analysis system 110 may implement code partitioning 130 to determine and apply a partitioning technique to input code, such as code base 120, in order generated partitioned code base 132 any execute code analyzers 140*a-d* in parallel. In this way, the differing performance times of code analyzers 140*a*-140*d* may be amortized across the set of code portions, such as code portions 132*a*, 132*b*, 132*c*, 132*d*, and 132*e*, so that the overall performance time of code analysis system 110 to provide analyzer results 142 may be less impacted by any one code analyzer 140.

Code base 120 may be a one or more code files, which may (or may not) be collected together as an application, project, repository, folder, or various organizing structures for managing the development of code base 120. Code in code base 120 may be source code, compiled code, interpreted code, machine code or various other forms of code. Code base 120 may be written or edited in an code editing application, such as a notebook or integrated development environment (IDE). Code base 120 may be obtained from various types of data stores, including code repositories that provide versioning or other change history.

As noted earlier, code partitioning 130 may be implemented to apply a partitioning technique to code base 120 in order to generate partitioned code base 132 with code portions 132*a*, 132*b*, 132*c*, 132*d*, and 132*e*. As discussed in detail below with regard to FIGS. 3-5C and 7-8 different partitioning techniques may be determined and applied by code partitioning 130. In some embodiments, partitioned code base 132 may recorded, marked, or otherwise preserved so that the results of the individual code analyzers 140a-140d can be associated with the different portions 132. Different partitioning techniques may result in different divisions of code base 120. For example, some partitioning techniques may create non-overlapping portions. Code portions 132a, 132b, and 132c, for instance, illustrate non-overlapping code portions in that they do not share code with another portion. Other code partitioning techniques may result in overlapping code portions. For instance, code portion 132d and code portion 132e overlap so that the code in the overlapping portion is provided as input to code analyzers 140a-140d both when code portion 132d is analyzed and when code portion 132e is analyzed. Such overlap allows for context or other dependencies within code base 120 to be visible to code analyzers 140a-140d when perform code analysis tasks.

Code analysis system 110 may execute code analyzers 140a-140d over partitioned code base 132 in parallel fashion, in some embodiments. For example, different code analyzers 140a-140d may analyze as input different code portions 132a-132e at the same time period or in overlapping time periods until each code analyzer 140a-140d has analyzed each code portion 132a-132e. Code analysis system 110 may aggregate the portion-specific results of individual code analyzers (e.g., the portion specific results of code analyzer 140a for code portions 132a-132e) into a result for the code analyzer (e.g., for 140a). Thus analyzer results 142 may provide results for each of the different code analyzers 140a-140d.

Please note that previous descriptions are not intended to be limiting, but are merely provided as an example of a code analysis system. Various other embodiments may also implement these techniques, as discussed in detail below.

The specification next includes a general description of a provider network, which may implement a code development service that implements partitioning code bases for parallel execution of code analysis. Then various examples of a code development service are discussed, including different components/modules, or arrangements of components/module that may be employed as part of implementing a provider network. A number of different methods and techniques to implement partitioning code bases for parallel execution of code analysis are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
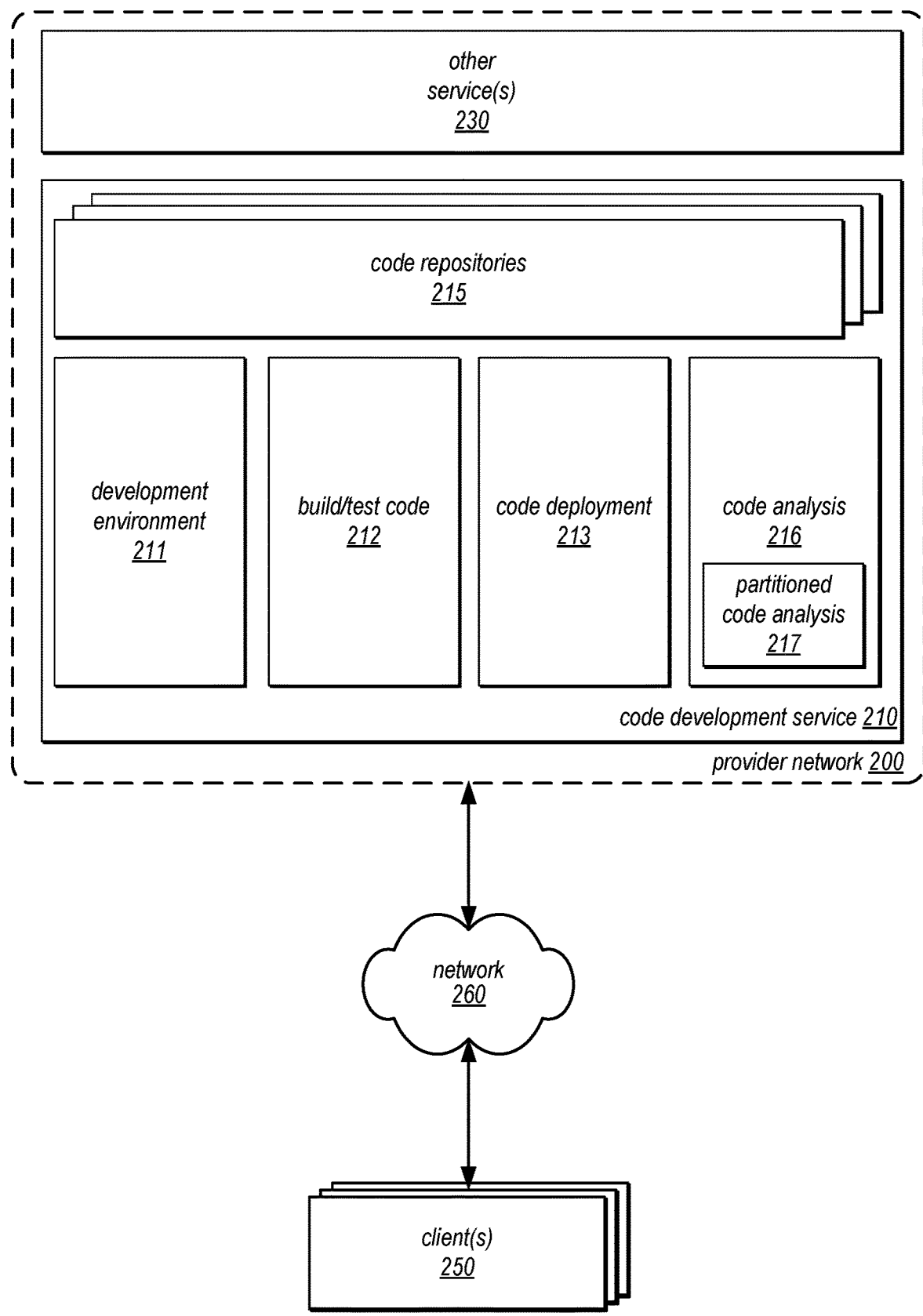
FIG. 2 is a logical block diagram illustrating a provider network that implements different services including a code development service that implements partitioning code bases for parallel execution of code analysis, according to some embodiments.

FIG. 2 is a logical block diagram illustrating a provider network that implements different services including a code development service that implements partitioning code bases for parallel execution of code analysis, according to some embodiments. A provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. The provider network 200 can provide convenient, on-demand network access to a shared pool of configurable computing resources that can be programmatically provisioned and released in response to customer commands. These resources can be dynamically provisioned and reconfigured to adjust to variable load.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. This compartmentalization and geographic distribution of computing hardware enables the provider network 200 to provide low-latency resource access to customers on a global scale with a high degree of fault tolerance and stability.

As noted above, provider network 210 may implement various computing resources or services, such as code development service 210, and other service(s) 230 which may be any other type of network based services, including various other types of storage (e.g., database service or an object storage service), compute, data processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given system or service component (e.g., a component of code development service 210) may be implemented by a particular node or may be distributed across several nodes. In some embodiments, a given node may implement the functionality of more than one service system component (e.g., more than one data store component).

Code development service 210 may be implemented by provider network 200, in some embodiments. Code development service 210 may implement various features for writing code for different systems, applications, or devices, providing features to recommend, identify, review, build, and deploy code. For example, code development service may implement development environment 211. Code development environment 211 may offer various code entry tools (e.g., text, diagram/graphics based application development) to specify, invoke, or otherwise write (or cause to be written) code for different hardware or software applications. Code development environment 211 may be able to invoke code analysis 216, in some embodiments, including partitioned code analysis 217. Code analysis 216 may perform various code analysis tasks, either as stand-alone, in parallel, or in pipelined fashion. While partitioned code analysis 217 may be utilized, in some scenarios non-partitioned analysis may be requested or performed as well by code analysis 216. In some embodiments, partitioning may be performed for a single code analysis task as well.

Code development service 210 may implement build/test code features 212, in various embodiments. Build/test code 212 may, for example, compile and execute code to test for performance problems, bottlenecks, anomalies, cost or expense (e.g., in terms of execution time and/or resource utilization), among other characteristics of code. In some embodiments, build/test code 212 may be able to invoke code analysis 216, in some embodiments. For example, a run-time, executable or other version of code may be evaluated using techniques to analyze code for security concerns as part of build/test 212.

Code development service 210 may, in some embodiments, implement code deployment 213. For example, code deployment 213 may allow for deployment pipelines to be created and utilized as part of Continuous Integration/Continuous Delivery (CI/CD) to automate the performance of various stages in an application lifecycle. As part of the deployment pipelines, code analysis 216 may be invoked, in some embodiments.

Code development service 210 may implement (or have access to) code repositories 215. Code repositories 215 may store various code files, objects, or other code that may be interacted with by various other features of code development service 210 (e.g., development environment 211 or build/test code 212). For example, code analysis 216 may access and evaluate code repositories 215 for code analysis for code repositories associated with an account and/or specified in a request for code analysis in some embodiments, according to the various techniques discussed below with regard to FIGS. 3-8. Code repositories 215 may implement various version and/or other access controls to track and/or maintain consistent versions of collections of code for various development projects, in some embodiments. In some embodiments, code repositories may be stored or implemented external to provider network 200 (e.g., hosted in private networks or other locations).

Code development service 210 may implement an interface to access and/or utilize various features of code development service 210. Such an interface may include various types of interfaces, such as a command line interface, graphical user interface, and/or programmatic interface (e.g., Application Programming Interfaces (APIs)) in order to perform requested operations. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Generally speaking, clients 250 may encompass any type of client configurable to submit network-based requests to provider network 200 via network 260, including requests for services (e.g., a request for practice discovery, etc.). For example, a given client 250 may include a suitable version of a web browser, or may include a plug-in module or other type of code module that may execute as an extension to or within an execution environment provided by a web browser. Alternatively, a client 250 may encompass an application (or user interface thereof), a media application, an office application or any other application that may make use of resources in provider network 200 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on a data storage service (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as virtualization hosts, control plane components as well as external networks 260 (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 250 may be attached to the overlay network so that when a client 250 provides an IP address that they want to send packets to, the IP address is run in virtual space by communicating with a mapping service that knows where the IP overlay addresses are.

Figure 3:
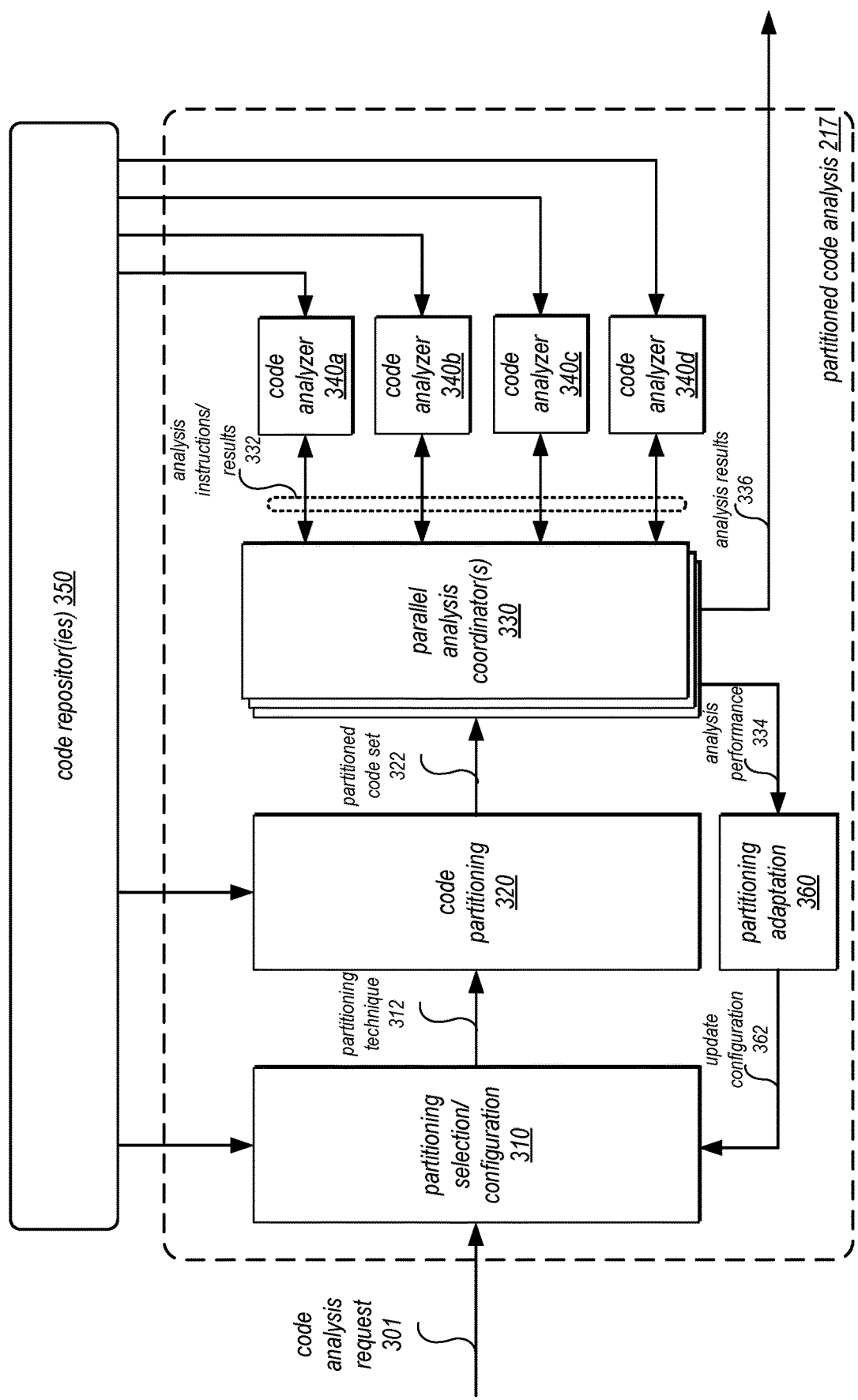
FIG. 3 is a logical block diagram illustrating parallel code analysis, according to some embodiments.

FIG. 3 is a logical block diagram illustrating parallel code analysis, according to some embodiments. Partitioned code analysis 217 may receive a code analysis request 301. This request 301 may be similar to request 610 discussed below with regard to FIG. 6. Partitioned code analysis 217 may implement partitioning selection/configuration 310, which may access, obtain, or otherwise evaluate the code base from code repository(ies) 350 to select a partitioning technique. For example, different techniques that select based on specified time limits, portion sizes, types of select analysis tasks, and so on may allow partitioning selection/configuration to determine which partitioning technique to apply (e.g., split-merge or size-limiting as discussed below).

The selected partitioning technique may then be provided 312 to code partitioning 320. Code partitioning 320 may obtain the code base and perform the selected partitioning. As indicated at 322, the partitioned code base 322 may be provided to parallel analysis coordinator 330, which may send instructions for analysis to code analyzers 340*a* through 340*d* to obtain different code portions, perform a respective code analysis task, and provide back the result to parallel analysis coordinator 330. Parallel analysis coordinator 330 may provide analysis performance 334 to partitioning adaption 360, which may, for example, determine an update to a partitioning configuration (e.g., adjusting portion minimum and/or maximum sizes), as indicated at 362. For example, failure to complete within a specified time limit may be used to make these adjustments. Parallel analysis coordinator 330 may provide the final analysis results, as indicated at 336.

One example of a partitioning technique may be called the "size limiting" technique. Size limiting may split the code base into non-overlapping subsets of up to S files each. To ensure determinism, the files are sorted in lexicographical order with respect to their names. Splitting is then performed on the sorted files. For example, the OWASP benchmark test set, which has 2,740 test classes and 162 shared classes (for a total of 2,902 files), may partitioned to produce, for example, 29 portions of size 100 and one portion of size 2.

Since method doSomething in class Test1 is called by 347 tests, it may be known these tests will be distributed over at least 4 portions. That is, all but one of these portions will not have access to the implementation of doSomething when running the static analysis. Depending on the analysis tool and its assumption on missing methods, this may result in a loss of findings, if the analysis under-approximates; or it may lead to false positives, if the analysis over-approximates; or it may crash the tool.

For this example, a splitting strategy is used that is able to create overlapping portions to reduce the number of unavailable code dependencies in each portion. In the following discussion, an example partitioning technique may be used, called Split-merge, and then an evaluation of its effect on the number of findings compared to the naïve strategy and to not splitting at all, as well as the overhead of computing partitions and possibly reanalyzing code that is shared between partitions.

In some embodiments, the analysis of a program P may be distributed, consisting of n files2 F={f1, . . . , fn} by splitting the program into portions R={r1, . . . , rm}(with m≤n) such that each partition ri contains no more than S files and can be analyzed independently with the target analysis tools. It may be ensured that the union of all partitions contains all files (union(iri)=F). In general, portions may not be required to be disjoint, for instance the same file may be replicated across multiple ones.

Split-merge may include three steps. Initially, a portion is created for each file in the code base, which includes the file itself and its transitive dependencies up to a distance k. The distance k is a parameter of Split-merge that allows to trade-off the size vs the degree of self-containment of the initial portions.

The second step—Split—ensures none of the initial portions exceeds the maximum size S by splitting any portion exceeding the size limit, while doing its best effort to preserve the dependency relations it contains. This step replicates the nodes with high degree of connectivity in all the split subsets, with the intuition that units with high connectivity are likely to carry semantic information shared by multiple sub problems.

Finally, the third step—merge—takes as input a set of portions of size less of equal than S and performs two tasks: 1) eliminate redundant portions subsumed by others and 2) merge small portions into larger ones to balance the load and further increase self-containment. A portion may be redundant if entirely contained into another. In this example, the portion [Thing1, ThingInterface] can be dropped since the remaining portions entirely cover its files and local dependencies. Merging small portions to maximize the size of their union, constrained by this size being smaller than S, can be framed as a restricted instance of a bin-packing problem. The optimal solution to this problem may converge to the smallest number of portions with approximately uniform size S that cover the input code base and is expected to balance the analysis load by assigning one portion to each executor.

Consider an example program P containing six files: A, B, C, D, E, F. The dependencies among these files are described in FIG. 4A, where a directed edge (x,y) from x to y denotes that x depends on y (symmetrically, that y is a dependency of x). Such dependencies can typically be computed statically in linear time with the size of P, using tools such as JDeps for Java Snakefood for Python. In the following, files and vertices, and dependencies and edges may be referred to interchangeably via the dependency graph.

Step 1: Initial portions. This step produces an initial set of portions of the program P aiming at preserving local dependencies. Given a program P composed of a finite set of files F={f0, f1, . . . } and a neighborhood radius k>0, algorithm 1 constructs for each file a portion including the file itself and its neighbors up to distance k. A large value for k makes the algorithm more conservative in preserving dependency information. However, it also increases redundancy and the likelihood to produce portions larger than the size limit S. In algorithm 1 in FIG. 5A, after computing the dependency graph, the first loop augments the dependency relation to include edges linking a vertex to its neighbors up to distance k, while the second loop builds one portion per vertex including it transitive dependencies up to distance k. For a sparse enough dependency graph with n vertices and k<<n, which is a common situation in practice, the algorithm runs in nearly O(n); the worst case complexity would be O(n3) for k≈n and a fully connected graph (by reduction to computing the graph transitive closure), although it is unlikely for any realistic program to resemble this situation. The function computeDependencyGraph returns the vertices and edges of the dependency graph. Each vertices of the graph corresponds to one file of the program under analysis.

Figure 4A:
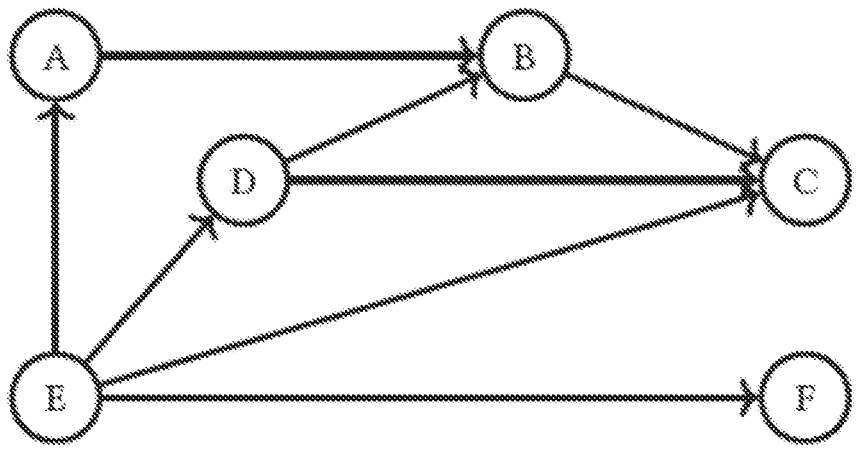
FIGS. 4A and 4B illustrate example dependency graphs for applying a partitioning technique to a code base, according to some embodiments.

The dependency graph of our example program P is shown in FIG. 4A. After the execution of the first loop in algorithm 1 with k=2, the dependency relation augmented is augmented with the transitive dependencies shown in FIGS. 4B, (A, C) and (E, B). The resulting initial portions are thus: {A, B, C}, {B, C}, {C}, {D, B, C}, {E, A, B, C, D, F}, {F}

Step 2: Split. Some initial portions may have size larger than the maximum S. This is especially likely for larger values of the neighborhood radius k. This step aims at splitting an oversized partition ri into smaller sets that fit within the size limit. However, uniformly splitting ri into the minimum number or necessary disjoint subsets is likely to delete relevant dependency information. Instead, it may deliberately produce a non-minimal number of subsets allowing redundancy to preserve dependency information. In particular, for a portion ri that exceeds the maximum size (|ri|>S), it may sort the vertices in descending degree of connectivity (number of incoming+outgoing edges) and identify two sets of vertices: high-connectivity, which includes the p (a percentage) of vertices with the largest degrees of connectivity, and low-connectivity ones, which includes the rest of vertices. The underlying intuition is that files involved with many dependency chains are likely to be relevant for the analysis of most subsets of ri. Therefore, algorithm 2 in FIG. 5B first identifies these two sets and then partitions the low-connectivity vertices uniformly into small enough subsets to allow adding to each such subset the high-connectivity vertices. This operation is formalized in the split function, which is applied on each initial portion whose size exceed S.

Figure 4B:
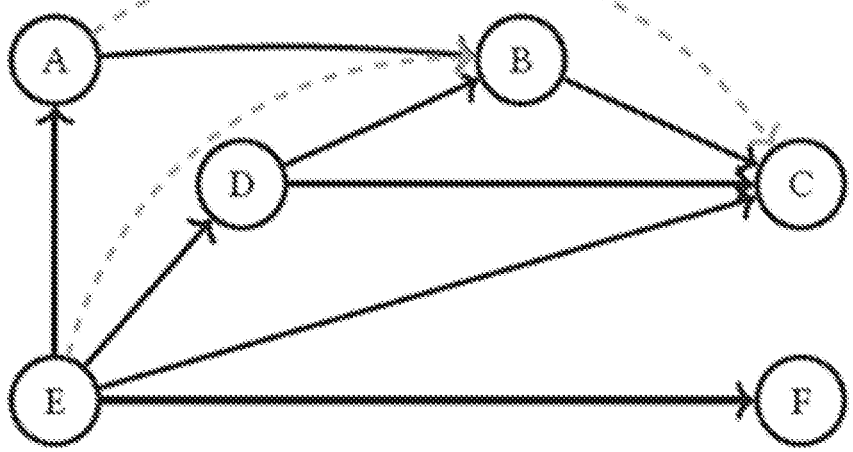

Consider S=4. The portion {E, A, C, D, F} exceeds such size. In FIG. 4B, vertex E has degree of connectivity 5, B and C have degree 4, A and D have degree 3, F has degree 1. Let p=⅓, E and B are selected as the high-connectivity vertices, leading to new portions {E, B, A, C}, {E, B, D, F} as replacement of {E, A, B, C, D, F}(where vertices with the same degree have been sorted alphabetically).

Step 3: Merge. The last step of Split-merge reduces the redundancy introduced by the previous steps and computes the final portion (algorithm 3 in FIG. 5C). Some partitions computed by the first two steps may be subsumed by others. For example, {B, C} is a subset of {A, B, C} in the partitions for our program P. In these situations, the information contained in the larger set subsumes the information in any of its subsets. The subsets can therefore be discarded, without loss of information (first loop in algorithm 3 in FIG. 5C).

The second part of this step aims at grouping together portions for the sake of balancing the analysis load distribution across multiple executors. This can be framed as an instance of the bin packing problem, where a set of items—the portions—have to fit within the minimum number of bins of size S. While finding the optimal solution is NP-hard, many heuristics have been proposed to efficiently compute near-optimal solutions. Among these, the next fit may be adopted, which has a time complexity of $O(n\log n)$ in the number of portions n (due to sorting). Despite it may result in up to twice the optimal number of portions, its fast execution time is preferred for the sake of minimizing the maximum analysis latency. Different algorithms can replace nextFit to trade off latency for a smaller number of parallel executors.

In a small-size example, the merge phase would result in the final partitioning already after the redundancy reduction phase, since any further merging by nextFit would result in an oversized portion. The final portions are: {D, B, C}, {E, B, A, C}, {E, B, D, F}. After the three steps of Split-merge, the resulting portions satisfy the desired properties: (1) each portion is smaller than the prescribed size S, e.g., |ri|≤S; (2) the union of the portions contains all files of the input program, e.g., union(iri)=F.

Figure 6:
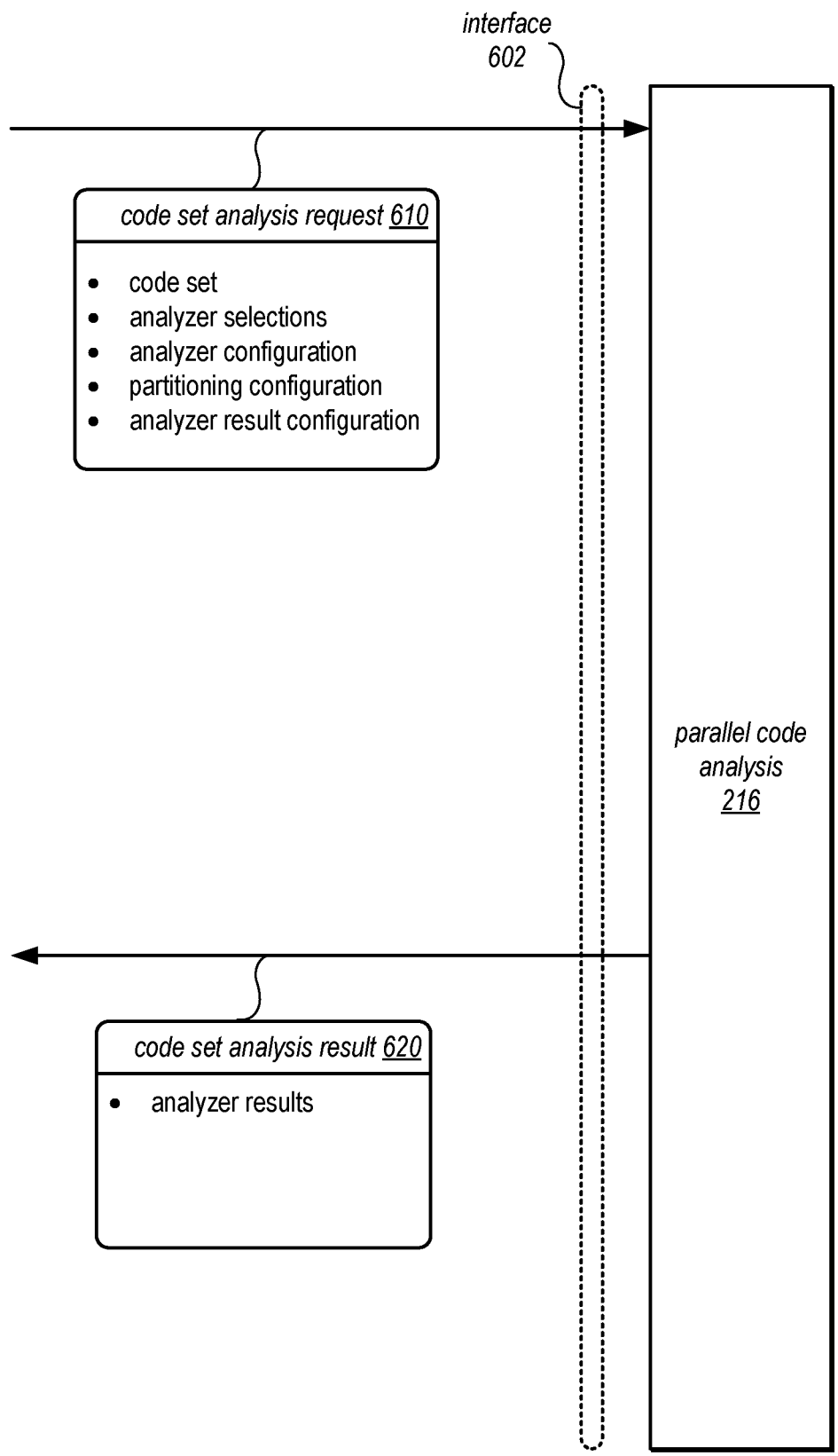
FIG. 6 is a logical block diagram illustrating interactions with parallel code analysis, according to some embodiments.

Partitioned code analysis 216 may implement techniques similar to those discussed above with regard to FIG. 1 and in more detail with regard to FIGS. 3-8. An interface to utilize these features may be implemented, in some embodiments, such as part of a larger interface of coding development service 210 (e.g., graphically as part of a web-console, programmatic interface using APIs, and/or command line interface). FIG. 6 is a logical block diagram illustrating interactions with parallel code analysis, according to some embodiments.

Interface 602 may support a request for code base analysis, as indicated at 610. Various features may be specified as part of the request. For example, the code base may be identified according to a location (e.g., file path, network address, etc.) or identifier (e.g., object identifier, file name, etc.). In some embodiments, analyzer selections may be specified, which may identify through identifiers, parameters, flags, or various other indications which code analysis tasks to perform. Configuration of selected analyzers, through various parameters or other criteria may be included. Partitioning configuration may be specified, in some embodiments. For example, a minimum and/or maximum portion size may be specified, as can other features such as performance configuration information (e.g., a time limit for analysis, such as 30 minutes). In some embodiments, analyze result configuration may be specified. For example, whether analyzer results are to be delivered as completed (e.g., on a per-code portion or per analyzer basis), or all together, in some embodiments.

As indicated at 620, a code base analysis result may be provided, in various embodiments. The code base analysis result may include individual analyzer results. The results may be aggregations of portion-specific results, in some embodiments. The result 620 may be provided, in some embodiments, according to a specified analyzer result configuration as discussed above.

Figure 7:
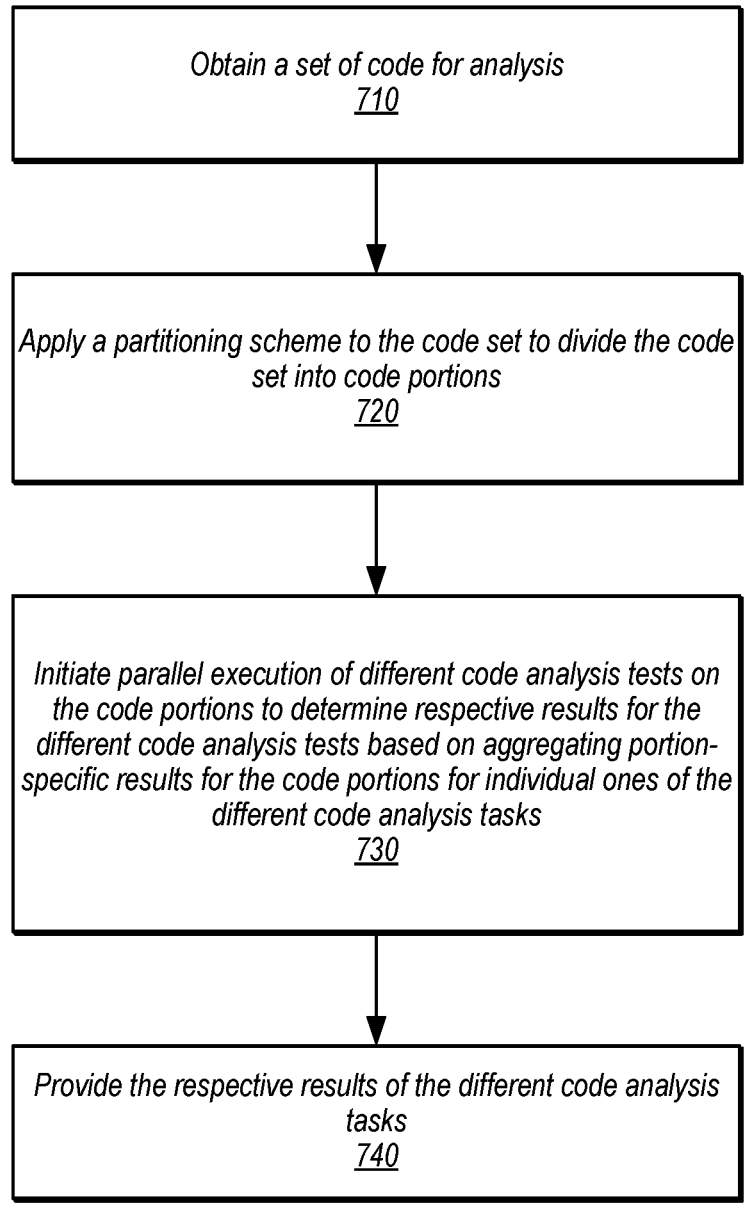
FIG. 7 is a high-level flowchart illustrating techniques and methods to implement partitioning code bases for parallel execution of code analysis, according to some embodiments.

The examples of partitioning code bases for parallel execution of code analysis discussed above with regard to FIGS. 2-6 have been given in regard to one example of a code development service. Various other types of code development tools, systems, or applications may implement these techniques. FIG. 7 is a high-level flowchart illustrating techniques and methods to implement partitioning code bases for parallel execution of code analysis, according to some embodiments. These techniques may be implemented using various components of a provider network as described above with regard to FIGS. 2-6 or other types or systems implementing code development tools or other applications.

As indicated at 710, a set of code may be obtained for analysis, in some embodiments. For example, a request to perform analysis may specify a location or identifier of the code base, in some embodiments. As indicated at 720, a partitioning scheme may be applied to the code base to divide the code base into code portions, in some embodiments. In some embodiments, the partitioning scheme may be dynamically selected and/or configured, as discussed above with regard to FIG. 3. Different partitioning techniques, such as split-merge or size limiting, as discussed above, may be applied.

As indicated at 730, parallel execution of different code analysis tasks on the code portions may be performed to determine respective results for the different code analysis tasks. These results may be determined based on aggregating portion-specific results for the code portions for individual ones of the different code analysis tasks. As indicated at 740, the respective results may be provided (e.g., via an interface of a code analysis system).

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement a provider network described herein). The various methods as illustrated in the figures and described herein represent example embodiments of methods. The order of any method may be changed, and various elements may be added, reordered, combined, omitted, modified, etc.

Partitioning code bases for parallel execution of code analysis as described herein may be executed on one or more computer systems, which may interact with various other devices. FIG. 8 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
 at least one processor; and
 a memory, storing program instructions that when executed by the at least one processor, cause the at least one processor to implement a code analysis system:
  receive, via an interface of the code analysis system, a code base for analysis;
  select a partitioning technique to apply to the code base based, at least in part, on one or more selections of a plurality of different code analysis tasks to respectively perform on each portion of the code base, wherein the partitioning technique determines how to divide the code base into portions;

apply the selected partitioning technique to the code base to divide the code base into a plurality of code portions;

direct parallel execution of the plurality of different code analysis tasks on the plurality of code portions to determine respective results for the different code analysis tasks based, at least in part, on aggregating portion-specific results for the plurality of code portions for individual ones of the different code analysis tasks; and send, via the interface, the respective results of the different code analysis tasks.

2. The system of claim 1, wherein the plurality of different code analysis tasks are selected as part of a request to perform the analysis on the code base received at the code analysis system.

3. The system of claim 1, wherein the code analysis system is further configured to update performance of the partitioning technique upon a different code base based, at least in part, performance of the parallel execution of the plurality of different code analysis tasks on the plurality of code portions.

4. The system of claim 1, wherein the code analysis system is implemented as part of a provider network, wherein the code analysis system is configured to receive the request to perform the analysis on the code base from another service of the provider network executing a deployment pipeline.

5. A method, comprising:

performing, by one or more computing devices implementing a code analysis system:

obtaining a code base for analysis;

selecting a partitioning technique to apply to the code base based, at least in part, on one or more selections of a plurality of different code analysis tasks to respectively perform on each portion of the code base, wherein the partitioning technique determines how to divide the code base into portions;

applying the partitioning technique to the code base to divide the code base into a plurality of code portions;

initiating parallel execution of the plurality of different code analysis tasks on the plurality of code portions to determine respective results for the different code analysis tasks based, at least in part, on aggregating portion-specific results for the plurality of code portions for individual ones of the different code analysis tasks; and providing the respective results of the different code analysis tasks.

6. The method of claim 5, wherein the plurality of different code analysis tasks are selected as part of a request to perform the analysis on the code base received at the code analysis system.

7. The method of claim 5, wherein applying the partitioning technique comprises applying a split-merge technique.

8. The method of claim 5, wherein applying the partitioning technique comprises applying a size limiting technique.

9. The method of claim 5, further comprising updating performance of the partitioning technique upon a different code base based, at least in part, performance of the parallel execution of the plurality of different code analysis tasks on the plurality of code portions.

10. The method of claim 5, wherein the plurality of different code analysis tasks are performed within a specified time limit specified as part of a received request to perform the analysis on the code base at the code analysis system.

11. The method of claim 5, wherein the plurality of code portions comprise two or more overlapping code portions.

12. The method of claim 5, wherein the partitioning technique is applied based on a partitioning configuration received as part of a request to perform the analysis on the code base at the code analysis system.

13. The method of claim 5, further comprising receiving a request from a code editor application to perform the analysis on the code base.

14. One or more non-transitory, computer-readable storage media, storing program instructions that when executed on or across one or more computing devices cause the one or more computing devices to implement:

receiving a code base for analysis;

selecting a partitioning technique to apply to the code base based, at least in part, on one or more selections of a plurality of different code analysis tasks to respectively perform on each portion of the code base, wherein the partitioning technique determines how to divide the code base into portions;

applying the partitioning technique to the code base to divide the code base into a plurality of code portions;

causing parallel execution of the plurality of different code analysis tasks on the plurality of code portions to determine respective results for the different code analysis tasks based, at least in part, on aggregating portion-specific results for the plurality of code portions for individual ones of the different code analysis tasks; and providing the respective results of the different code analysis tasks.

15. The one or more non-transitory, computer-readable storage media of claim 14, wherein the plurality of different code analysis tasks are selected as part of a received request to perform the analysis on the code base.

16. The one or more non-transitory, computer-readable storage media of claim 14, wherein the plurality of different code analysis tasks are performed within a specified time limit specified as part of a received request to perform the analysis on the code base.

17. The one or more non-transitory, computer-readable storage media of claim 14, wherein applying the partitioning technique comprises applying a split-merge technique.

18. The one or more non-transitory, computer-readable storage media of claim 14, wherein the plurality of code portions comprise two or more overlapping code portions.

19. The one or more non-transitory, computer-readable storage media of claim 14, wherein the plurality of code portions comprise two or more non-overlapping code portions.

20. The one or more non-transitory, computer-readable storage media of claim 14, wherein the one or more computing devices are implemented as part of a service of a provider network, wherein the one or more non-transitory, computer-readable storage media store further program instructions that cause the one or more computing devices to further implement receiving the request to perform the analysis on the code base from another service of the provider network executing a deployment pipeline.

* * * * *